United States Patent
Saini et al.

(10) Patent No.: US 12,499,168 B2
(45) Date of Patent: Dec. 16, 2025

(54) RETRIEVAL OF NOVEL KEYWORDS FOR SEARCH

(71) Applicant: Microsoft Technology Licensing, LLC, Redmond, WA (US)

(72) Inventors: Deepak Saini, Bellevue, WA (US); Jian Jiao, Bellevue, WA (US); Sachin Yadav, Delhi (IN); Bhawna Paliwal, Haryana (IN); Anirudh Buvanesh, Mumbai (IN); Manik Varma, New Delhi (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/608,061

(22) Filed: Mar. 18, 2024

(65) Prior Publication Data

US 2025/0291867 A1    Sep. 18, 2025

(51) Int. Cl.
*G06F 16/9538* (2019.01)
*G06F 16/9536* (2019.01)
*G06F 16/954* (2019.01)

(52) U.S. Cl.
CPC ...... *G06F 16/9538* (2019.01); *G06F 16/9536* (2019.01); *G06F 16/954* (2019.01)

(58) Field of Classification Search
CPC . G06F 16/9538; G06F 16/9536; G06F 16/954
See application file for complete search history.

(56) References Cited

U.S. PATENT DOCUMENTS

| 12,073,188 B1* | 8/2024 | Gao | G06F 16/3337 |
| 2009/0248476 A1* | 10/2009 | Trinh | G06Q 10/107 |
| | | | 705/7.19 |
| 2013/0304721 A1* | 11/2013 | Fakeih | G06F 16/337 |
| | | | 707/710 |

(Continued)

OTHER PUBLICATIONS

Deepak et al., "Impact of word embedding models on text analytics in deep learning environment: a review", Feb. 22, 2023, pp. 10345-10425 (Year: 2023).*

(Continued)

*Primary Examiner* — Jared M Bibbee
(74) *Attorney, Agent, or Firm* — CALFEE, HALTER & GRISWOLD LLP

(57) ABSTRACT

A computing system obtains a novel keyword from a keyword database comprising a plurality of keywords. The computing system provides the novel keyword as input into an encoder and obtains a textual embedding of the novel keyword. The computing system identifies classifiers for similar seen keywords to the novel keyword. The novel keyword embedding and the classifiers are provided as input into a combiner model which outputs a textual embedding representative of the novel keyword and the seen keyword classifiers. The computing system compares the output of the combiner model to a textual embedding of query text. The computing system then identifies content based upon a computed similarity between the query text and the output of the combiner model. The computing system causes presentation of search results at a client computing device wherein the results include content selected based upon the computed similarity.

20 Claims, 5 Drawing Sheets

(56) References Cited

U.S. PATENT DOCUMENTS

| | | | |
|---|---|---|---|
| 2023/0298592 A1* | 9/2023 | Yang | G10L 17/08 704/232 |
| 2024/0028631 A1* | 1/2024 | Gong | G06F 16/3344 |
| 2025/0053585 A1* | 2/2025 | Duran | G06F 16/334 |

OTHER PUBLICATIONS

Yogatama, et al., "Bayesian optimization with a finite budget: An approximate dynamic programming approach", In New Directions in Neural Networks, 30th Conference on Neural Information Processing Systems, ICANN, 2018, 9 Pages.

Zhang, et al., "Fast multi-resolution transformer fine-tuning for extreme multi-label text classification", In 35th Conference on Neural Information Processing Systems, 2021, 14 pages.

Zhou, et al., "Revisiting class-incremental learning with pre-trained models: Generalizability and adaptivity are all you need", International Journal of Computer Vision, 133, No. 3, Aug. 5, 2024, 19 Pages.

Zhu, et al., Prototype Augmentation and Self-Supervision for Incremental Learning, In Proceedings of the IEEE/CVF conference on computer vision and pattern recognition (CVPR), 2021, pp. 5871-5880.

Aditi Singh, et al., "FreshDiskANN: A Fast and Accurate Graph-Based ANN Index for Streaming Similarity Search", arXiv:2105.09613 [cs.IR], May 20, 2021, 19 Pages.

Aggarwal, et al., "Bidding to the top: VCG and equilibria of position-based auctions", In International workshop on approximation and online algorithms, arXiv:cs/0607117v1, Jul. 26, 2006, 14 pages.

Aggarwal, et al., SemSup-XC: Semantic Supervision for Zero and Few-shot Extreme Classification. In International Conference on Machine Learning PMLR, 2023, 20 pages.

Aljundi, et al., "Gradient based sample selection for online continual learning", 33rd Conference on Neural Information Processing Systems, 2019, 10 pages.

Babbar, et al., "DiSMEC: Distributed Sparse Machines for Extreme Multi-label Classification", In WSDM, 2017, pp. 721-729.

Bhatia, et al., "The Extreme Classification Repository: Multi-label Datasets & Code" accessed on link http://manikvarma.org/downloads/XC/XMLRepository.html, 2016, 16 pages.

Broder, et al., "Search Advertising using Web Relevance Feedback", In Proceedings of the 17th ACM conference on information and knowledge management, CIKM, 2008, 10 pages.

Changpinyo, et al., "Synthesized Classifiers for Zero-Shot Learning", In Proceedings of the IEEE conference on computer vision and pattern recognition, CVPR, 2016, pp. 5327-5336.

Chaudhry, et al., "Riemannian Walk for Incremental Learning: Understanding Forgetting and Intransigence", In Proceedings of the European conference on computer vision (ECCV), 2018, 16 Pages.

Craswell, et al., "Overview of the TREC 2019 deep learning track", arXiv:2003.07820v2, Mar. 18, 2020, 22 Pages.

Dahiya, et al., "Deep encoders with auxiliary parameters for extreme classification", In Proceedings of the 29th ACM SIGKDD Conference on Knowledge Discovery and Data Mining, Aug. 2023, pp. 358-367.

Dahiya, et al., "DeepXML: A Deep Extreme Multi-Label Learning Framework Applied to Short Text Documents", arXiv:2111.06685v1, Nov. 12, 2021, 09 Pages.

Dahiya, et al., "NGAME: Negative mining-aware mini-batching for extreme classification", Proceedings of the Sixteenth ACM International Conference on Web Search and Data Mining, Feb. 2023, 9 pages.

Dahiya, et al., "SiameseXML: Siamese Networks meet Extreme Classifiers with 100M Labels", In Proceedings of the 38th International Conference on Machine Learning, 2021, 11 Pages.

Dahiya, et al., "DeepXML: A Deep Extreme Multi-Label Learning Framework Applied to Short Text Documents", Proceedings of the 14th ACM International Conference on Web Search and Data Mining, Mar. 2021, pp. 31-39.

Extended European Search Report Received in European Patent Application No. 25163090.1 mailed on Jun. 12, 2025, 16 pages.

Gao, et al., "SimCSE: Simple contrastive learning of sentence embeddings", In Proceedings of the 2021 Conference on Empirical Methods in Natural Language Processing, 2021, pp. 6894-6910.

Gao, et al.," Label-activating framework for zero-shot learning", In Neural Networks, vol. 121, 2019, pp. 1-9.

Goodfellow, et al., "An empirical investigation of catastrophic forgetting in gradient-based neural networks" arXiv preprint arXiv:1312.6211 (2013), Mar. 4, 2015, 9 Pages.

Guo, et al., "Quantization based fast inner product search", In Artificial Intelligence and Statistics, PMLR, May 2, 2016, pp. 482-490.

Gupta, et al., "Distributional Semantics Meets Multi-Label Learning",. In Proceedings of the AAAI Conference on Artificial Intelligence, vol. 33, No. 01,2019, pp. 3747-3754.

Gupta, et al., "Elias: End-to-end learning to index and search in large output spaces", In 36th Conference on Neural Information Processing Systems 35, 2022, 12 pages.

Gupta, et al., "Generalized Zero-Shot Extreme Multi-label Learning", Proceedings of the 27th ACM SIGKDD Conference on Knowledge Discovery & Data Mining, Aug. 14, 2021, pp. 527-535.

Jain, et al., "Slice: Scalable Linear Extreme Classifiers trained on 100 Million Labels for Related Searches", Proceedings of the Twelfth ACM International Conference on Web Search and Data Mining, 2019, 9 pages.

Jiang, et al., "LightXML: Transformer with Dynamic Negative Sampling for High-Performance Extreme Multi-label Text Classification", In Proceedings of AAAI Conference on Artificial Intelligence, vol. 35, Issue No. 09, May 18, 2021, pp. 7987-7994.

Kahndagale, et al., "Bonsai: diverse and shallow trees for extreme multi-label classification", In Machine Learning, Aug. 23, 2020, 21 pages.

Kang, et al., "A noise-filtered under-sampling scheme for imbalanced classification", IEEE Transactions on Cybernetics, vol. 47, Issue 12, Oct. 12, 2016, pp. 4263-4274.

Karpukhin, et al., "Dense Passage Retrieval for Open-Domain Question Answering", In Proceedings of the Conference on Empirical Methods in Natural Language Processing, Nov. 16, 2020, pp. 6769-6781.

Kharbanda, et al., "Cascadexml: Rethinking transformers for end-to-end multi-resolution training in extreme multi- label classification", In 36th Conference on Neural Information Processing Systems, 35, 2022, 14 pages.

Khattab, et al., "ColBERT: Effcient and Effective Passage Search via Contextualized Late Interaction over BERT", arXiv:2004.12832v2, Jun. 4, 2020, 10 pages.

Mccloskey, et al., "Catastrophic Interference In Connectionist Networks: The Sequential Learning Problem", In Proceedings of the Psychology of learning and motivation, vol. 24, Jan. 1, 1989, pp. 109-165.

Medini, et al., "Extreme Classification in Log Memory using Count-Min Sketch: A Case Study of Amazon Search with 50M Products", In 33rd Conference on Neural Information Processing Systems, 2019, 11 pages.

Mensink, et al., COSTA: Co-Occurrence Statistics for Zero-Shot Classification. In Proceedings of the IEEE conference on computer vision and pattern recognition (CVPR), 2014, 8 Pages.

Mensink, et al., "Distance-Based Image Classification: Generalizing to New Classes at Near-Zero Cost", IEEE Transactions on Pattern Analysis and Machine Intelligence 35, 11 ,2013, 15 pages.

Mittal, et al., "ECLARE: Extreme Classification with Label Graph Correlations", In Proceedings of the Web Conference, Apr. 2021, In WWW'21, 12 pages.

Qu, et al., "RocketQA: An Optimized Training Approach to Dense Passage Retrieval for Open-Domain Question Answering", In Proceedings of the 2021 Conference of the North American Chapter of the Association for Computational Linguistics: Human Language Technologies, 2021, pp. 5835-5847.

R. You, et al., "AttentionXML: Extreme Multi-Label Text Classification with Multi-Label Attention Based Recurrent Neural Networks", arXiv:1811.01727v2, Jun. 17, 2019, 16 Pages.

(56) References Cited

OTHER PUBLICATIONS

Robertson, et al., "The Probabilistic Relevance Framework: BM25 and Beyond", In Journal of Foundations and Trends® in Information Retrieval, vol. 3, Issue 4, Dec. 17, 2009, pp. 333-389.
Romera-P, et al., "An embarrassingly simple approach to zero-shot learning", In International conference on machine learning (ICML), Jun. 1, 2015, 10 Pages.
Saini, et al., "GalaXC: Graph Neural Networks with Labelwise Attention for Extreme Classification", In Proceedings of the Web Conference, Apr. 19, 2021, 12 Pages.
Sanh, et al., "DistilBERT, a distilled version of BERT: smaller, faster, cheaper and lighter", arXiv:1910.01108, Oct. 2, 2019, 5 Pages.
Snell, et al., "Prototypical Networks for Few-shot Learning", 31st Conference on Neural Information Processing Systems (NIPS) 2017, 11 Pages.
Subramanya, et al., "DiskANN: Fast Accurate Billion-point Nearest Neighbor Search on a Single Node", 33rd Conference on Neural Information Processing Systems (NeurIPS), 2019, 11 Pages.
Wang, et al., "Learning to Prompt for Continual Learning", arXiv:2112.08654 [cs.LG], In Proceedings of the IEEE/CVF conference on computer vision and pattern recognition, 2022, pp. 139-149.
Xiong, et al., "Approximate nearest neighbor negative contrastive learning for dense text retrieval", arXiv preprint arXiv:2007.00808, Oct. 20, 2020, 16 Pages.
Xiong, et al., "Extreme Zero-Shot Learning for Extreme Text Classification", arXiv:2112.08652 [cs.LG], Dec. 16, 2021, 16 Pages.
Xu, et al.,, "Attribute Prototype Network for Zero-Shot Learning", 34th Conference on Neural Information Processing Systems (NeurIPS), 2020, 12 Pages.
Yadav, et al., "Extreme Meta-Classification for Large-Scale Zero-Shot Retrieval", Proceedings of the 30th ACM SIGKDD Conference on Knowledge Discovery and Data Mining, Aug. 25, 2024, pp. 3657-3666.
Yang, et al., "GraphFormers: GNN-nested Transformers for Representation Learning on Textual Graph", In Repository of arXiv:2105_02605v2, Sep. 30, 2021, 12 Pages.
Communication pursuant to Rule 69 EPC—reminder concerning payment of the designation fee (Art. 79(2) EPC) and of the examination fee (Art. 94(1) EPC)—and invitation pursuant to Rule 70a(1) Received in European Application No. 25163090.1 mailed on Sep. 29, 2025, 02 pages.

\* cited by examiner

RETRIEVAL OF NOVEL KEYWORDS FOR SEARCH

BACKGROUND

Online search generally involves a computer-implemented search engine receiving a query set forth by a user operating a client computing device and the search engine retrieving and returning results relevant to the query to the client computing device. The query comprises text that is indicative of what the user is searching for, and the search engine uses the query text to identify results that are relevant to the query. Conventionally, the search engine identifies relevant results based upon textual similarity between the query text and the results and returns the relevant results to the client computing device for presentation to the user. The query may be refined by the user through additional text and/or alternative phrasing to which the search engine will provide updated results based on the modified query.

It is a further aspect of conventional search engines that, in addition to returning results that are responsive to the query, the search engine may also present additional results or content that is provided by a content publisher. The search engine can retrieve the additional results or content by mapping text of the input query to certain keywords associated with the content publisher. It is an objective of the content publisher that certain types of keyword matches will result in a user interaction (e.g., a "click") when content associated with the keyword is presented to the user.

Conventional search engines can provide a platform where content publishers can bid on certain keywords such that when the search engine determines a match between the query and a keyword, the search engine will ensure that results or content provided by the publisher will be presented as part of the search results. For example, if a content publisher has bid on the keywords "running shoes" a query related to running shoes (e.g., "what are the best running shoes for men") might cause the search engine to return results including content (e.g., link to an article, review, an advertisement, etc.) related to running shoes associated with the content publisher. The degree of similarity between the keyword and the query text is also considered. For example, the search engine may differentiate between keywords that are an exact textual match versus a partial match. Different content providers may be separately associated with a keyword based on each match type, adding further complexity to the keyword retrieval problem and underscoring the criticality of an accurate retrieval of an appropriate keyword.

SUMMARY

The following is a brief summary of subject matter that is described in greater detail herein. This summary is not intended to be limiting as to the scope of the claims.

Various technologies pertaining to improved retrieval of novel keywords for search are described herein. It is a general aspect of online search that search engines are configured to return results in response to a query. However, search engines may also return additional content or specific results based upon a match between the query text and certain keywords. For example, the search engine may offer certain keywords for sponsorship by third parties. For example, when a "sponsored" keyword appears in a query (or the search engine separately determines a relationship between the query and the keyword), the search engine may return content associated with that keyword, and more specifically, content that is related to a third party that has sponsored the keyword. When the search engine determines a relationship between the query text and one of the keywords, the search engine can return results comprising the content.

The search engine maintains a database of billions of keywords that can be bid on by content publishers. In one conventional approach, the search engine relies upon determining a degree of textual similarity between the query text and the keywords associated with the content publisher to make a match and serve the additional content. In another conventional approach, a keyword matching the query is identified using learned keyword classifiers. The keyword classifiers are trained using data from positive query-keyword matches (e.g., the content served as a result of a query-keyword match results in a user interaction with the content). As the classifiers require user interaction data to be trained, they cannot be utilized for keywords for which there is little or no interaction data due to the novelty of the keyword. Moreover, as models are constantly being retrained with new data (e.g., every new interaction), they suffer from a phenomenon referred to as "catastrophic forgetting" meaning that as the models are updated on newer and newer keyword interaction data, data relating to older keywords is "forgotten" by the models. This results in older keywords or keywords that have not received recent interaction to be less likely matched with query text, even if they are the more relevant to the query than newer keywords promoted by the model. Yet another conventional approach utilizes a language encoder that encodes the query text and keyword text to compare the embedded text to identify a match. While encoder-based approaches may be able to determine lexical similarity, they fail to capture higher order semantic similarities. Moreover, conventional encoder-based solutions suffer from the same potential for catastrophic forgetting as the models are constantly retrained with new interaction data. Retraining the base models is also computationally expensive, leading to significant computational overhead.

The conventional search and keyword retrieval approaches described above tend to work well for keywords that have been interacted with a high number of times. However, the conventional approaches are deficient with respect to matching keywords that have no interaction data. For example, keywords related to new products, future events, or breaking news are streamed into the existing keyword database but lack interaction data due to their novelty. Retrieving these "novel" keywords is important as new keywords become available, for example, as new products are released, new events are announced, etc., situations where keywords descriptive of these items would not have been seen before.

The technologies described herein solve a deficiency of conventional search approaches with respect to matching a given query with novel keywords keywords that have yet been seen or interacted with when served in connection with the search engine presenting search results. It is a further technical advantage of an aspect of the described technology that the computational overhead required for ingesting novel keywords into the search engine pipeline is reduced. This reduces the latency and complexity of the overall online search infrastructure. It is another advantage of the presently described technologies that models associated with keyword retrieval need not be retrained as new interactions are observed, greatly reducing computational overhead of keyword retrieval. Further still, certain model-based approaches are similarly deficient with respect to keyword retrieval based upon the size of the dataset; solutions that are optimal for 1000 class sets cannot reasonably be applied to retrieval of novel keywords in a keyword database comprising hundreds of millions or billions of keywords. The technologies described herein are well suited for keyword retrieval of very large datasets, such as keyword databases used for computer-implemented search.

While generally described with respect to search, the technologies described herein have further advantageous implications in related fields of document tagging, product-to-product recommendations, and other areas where retrieval of novel items is used.

Certain functionality of the technologies described herein are illustrated through the following examples. In a first example, a computing system comprising a search engine receives a query set forth by a user operating a client computing device. The query comprises text indicative of the intent of the user, for example, what the user is searching for. The computing system provides the query text as input into an encoder module that is configured to generate an output comprising a textual embedding representative of the query text. In an example, the encoder may be a language-based encoder, such as the Bidirectional Encoder Representations from Transformers (BERT) model.

The computing system further obtains a novel keyword from a keyword database comprising a plurality of keywords. The keywords in the database comprise one or more words and, in some examples, can comprise portions of words (e.g., acronyms, abbreviations, etc.) or entire phrases made up of several words. For example, a keyword may be a single word such as "travel" or something more specific such as "air travel." A keyword may also include a phrase such as "flights from Cleveland to Seattle." The keyword database therefore comprises billions of keywords comprising many different combinations of words and phrases. It is a further aspect of the keywords in the keyword database that each keyword may be associated with content related to that keyword. For example, if the keyword is "air travel", an associated content might be a link to an airline website where air travel can be booked. In some examples, third parties like content publishers can bid for the opportunity to choose content to be associated with certain keywords.

After obtaining the novel keyword, the computing system provides the novel keyword to the encoder module. The encoder module outputs a textual embedding representative of the novel keyword. Because the novel keyword and the query text are encoded using the same encoder module, the system could attempt to determine a match. However, relying on the encoder alone is limited to lexical similarity and fails to capture higher order semantic relationships. The system further enriches the novel keyword encoding through combining textual embedding of the novel keyword with additional information.

Based upon the novel keyword textual embedding, the system identifies classifiers for seen keywords that are similar to the novel keyword. In an example, a seen keyword is a keyword that has been served by the search engine and has been interacted with by a user. When a keyword is interacted with (e.g., a user clicks on the keyword or its associated content) the resulting interaction data can be used to train a classifier for that keyword. Classifiers typically require several interactions (>10) to be sufficiently trained on a keyword. Each classifier is then representative of a specific keyword and content associated with the keyword (e.g., whatever was served by the search engine responsive to a query). The interaction data may further comprise additional information (for example, collaborative signals) relating to other content that a user or users have interacted with. For example, returning to the air travel example, if a user has interacted with the "air travel" keyword, but has also interacted with related keywords such as "flights from Cleveland to Seattle" and "flights from Cleveland to Miami", the learned classifier's collaborative signals are indicative of a user that is based in Cleveland, USA. Similarly, if the user who interacted with the "flights from Cleveland to Seattle" has also interacted with keyword "hotels in Seattle" the learned classifier's collaborative signals are indicative of a user that is planning a trip to a specific destination. Trained classifiers are therefore able to model relations beyond textual similarity and capture higher order semantic relationships.

In an example, the system identifies one or more classifiers of similar seen keywords by evaluating the novel keyword across all of the available classifiers to determine a similarity score (for example, a value between 0 and 1) wherein the classifiers with the highest value similarity score are selected by the system. The system may select a different number of classifiers based upon a threshold value (for example, top 100 classifiers with a similarity score above 0.9, etc.). According to some examples, a tiered approach may be employed wherein the system computes similarity score across all available classifiers to obtain the top-k associated seen classifiers. This shortlist of classifiers may then be refined again to further refine the set of similar seen classifiers. In some examples, the system uses Approximate Nearest Neighbor Search (ANNS) to identify the classifiers of similar seen keywords. In some examples, a maximum inner product search (MIPS) is used to identify classifiers of similar seen keywords.

Once the classifiers of similar seen keywords are identified, the system provides the novel keyword textual embedding and the classifiers for the similar seen keywords as input into a combiner model. In some examples, a vector representation of the classifier (and its encoded data) is provided to the combiner model. The combiner model generates a textual embedding as output that is representative of the novel keyword and the one or more seen keyword classifiers. As previously mentioned, because the seen keyword classifiers comprise a significant amount of additional data in the form of the collaborative signals, the resultant textual embedding output by the combiner model is significantly more robust than the textual embedding for the novel keyword alone.

The system may then compute a similarity score between the textual embedding of the query text and the textual embedding output by the combiner module. The system then generates search results based upon the query wherein the results comprise the novel keyword or a content associated with the novel keyword. In some examples the content provided as part of the search results is selected based upon the similarity score and/or a match type.

The above-described technologies present various advantages over conventional search technologies. Conventional search methodologies perform poorly with respect to retrieval of novel keywords. The technologies described herein demonstrate that an enriched representation of a novel keyword leads to better representation of the keyword and can result in improvement in the likelihood of interaction with the keyword and/or keyword content when presented as part of search results served responsive to a query.

The above presents a simplified summary in order to provide a basic understanding of some aspects of the systems and/or methods discussed herein. This summary is not an extensive overview of the systems and/or methods discussed herein. It is not intended to identify key/critical

Figure 1:
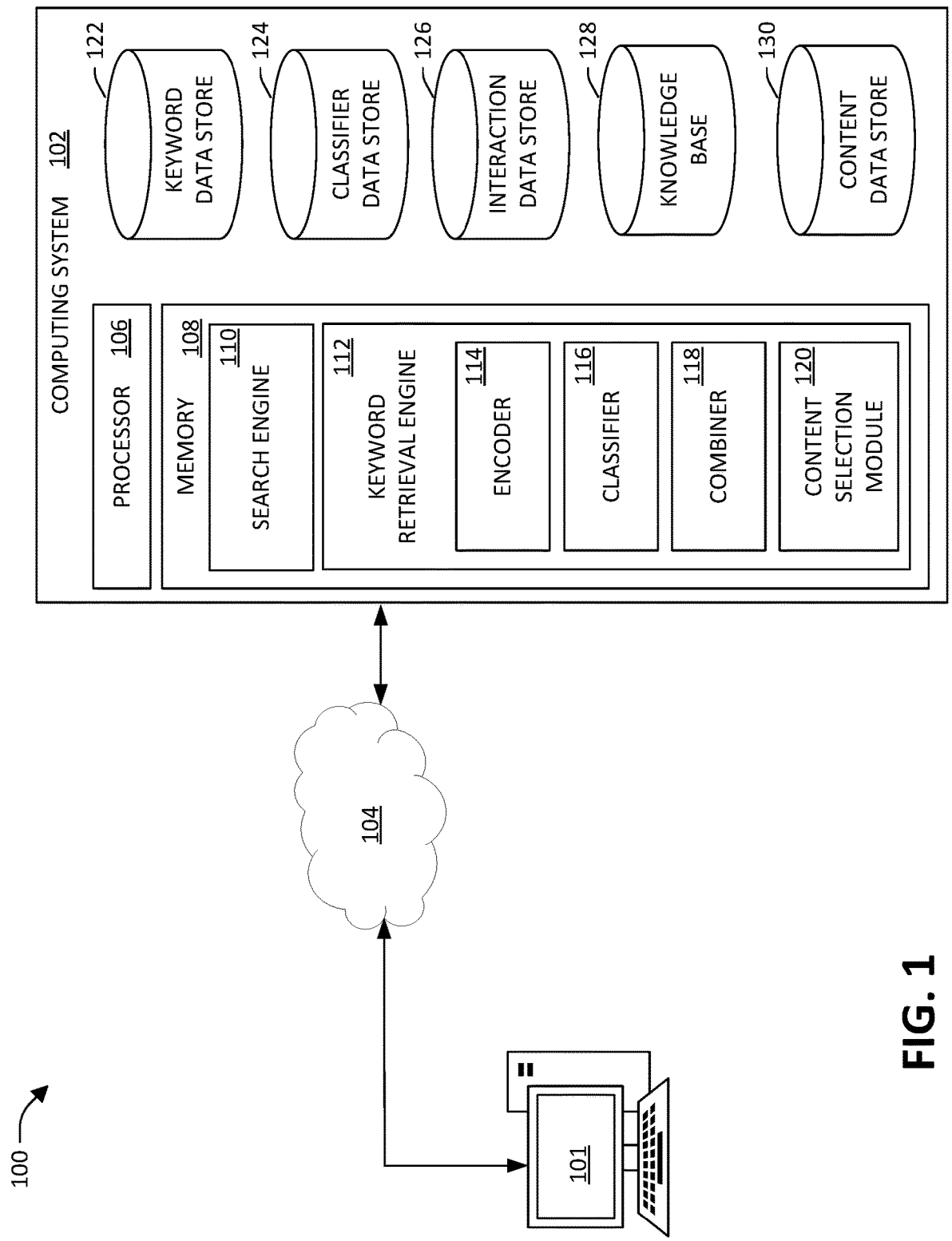
FIG. 1 is a functional block diagram of an example computing environment that facilitates retrieval of novel keywords for search.

Various technologies pertaining to improved retrieval of novel keywords for search are described herein are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

DETAILED DESCRIPTION

As noted above, conventional computer-implemented search engines perform poorly at matching query text with novel keywords for purposes of serving content associated with the keywords. In an example, novel keywords are keywords that have not yet been seen or interacted with as part of search results generated by the search engine. Novel keywords related to new products, future events, or breaking news are streamed into an existing keyword database but lack interaction data due to their novelty. Retrieving these "novel" keywords is important as new keywords become available, for example, as new products are released, new events are announced, etc. The various methodologies applied by conventional systems are reliant on a high degree of textual similarity or previous interaction to accurately retrieve keywords based upon an input query. The technologies described herein facilitate accurate retrieval of zero-shot (no previous interaction) and one-shot (one previous interaction) "novel" keywords in order to accurately match an input query to a novel keyword.

In example operation, a computing system comprising a search engine receives a query set forth by a user operating a client computing device. The query comprises text indicative of the intent of the user, e.g., what the user is searching for. The computing system provides the query text as input into an encoder module that is configured to generate an output comprising a textual embedding representative of the query text.

The computing system further obtains a novel keyword from a keyword database comprising a plurality of keywords. Novel keywords can be streamed into the keyword database as they are generated (e.g., by a content provider). After obtaining the novel keyword from the keyword database, the computing system provides the novel keyword to the encoder module, where the encoder module outputs a textual embedding representative of the novel keyword.

Based upon the novel keyword textual embedding, the system identifies classifiers for seen keywords that are similar to the novel keyword. The classifiers rely upon interaction data related to each keyword to train the classifier to provide accurate labels. Each classifier is representative of a specific keyword and the interaction data associated with the keyword. The interaction data may further comprise additional information (e.g., collaborative signals) relating to other content that a user has interacted with. Collaborative signals can be used to differentiate between items that are textually similar but are in fact unrelated (e.g., a movie and book that share the same title but unrelated subject matter).

In an example, the system identifies one or more classifiers of similar seen keywords by evaluating the novel keyword across all of the available classifiers to determine a similarity score (e.g., a value between 0 and 1) wherein the classifiers with the highest value similarity score are selected by the system. Once the classifiers of similar seen keywords are identified, the system provides the novel keyword textual embedding and the classifiers for the similar seen keywords as input into a combiner model. The combiner model generates a textual embedding as output that is representative of the novel keyword and the one or more seen keyword classifiers. As the combiner model receives a sequence of inputs (e.g., the novel keyword embedding and the classifiers for similar seen keywords) and responsively outputs a single vector representation, different instantiations of the combiner model are contemplated. In some examples, the combiner is a single-layer self-attention block with novel type-embeddings. In certain examples, k self-attention blocks may also be used. In another example, the combiner model may use vector pooling (e.g., sum, max, weighted sum, etc.). As previously mentioned, because the seen keyword classifiers comprise a significant amount of additional data in the form of the collaborative signals, the resultant textual embedding output by the combiner model is significantly more robust than the textual embedding for the novel keyword alone.

The system then computes a similarity score between the textual embedding of the query text and the textual embedding output by the combiner module. The system then generates search results based upon the query wherein the results comprise the novel keyword or a content associated with the novel keyword.

The above-described technologies present various advantages over conventional search technologies. Conventional search methodologies perform poorly with respect to retrieval of novel keywords. The technologies described herein demonstrate that an enriched representation of a novel keyword leads to better representation of the keyword and can result in improvement in the likelihood that a keyword will result in an interaction when presented as part of search results served responsive to a query. As described herein, novel keywords comprise zero-shot (no previous interaction) or one-shot (one previous interaction) keywords. In some examples, the described technology may be similarly applied to k-shot keywords that have k interactions.

Various technologies pertaining to improved retrieval of novel keywords for search as described herein are now described with reference to the drawings.

With reference to FIG. 1, an example computing environment 100 is illustrated. The computing environment 100 includes a computing system 102. According to some embodiments, the computing system 102 is a server computing device. According to other embodiments, the computing system 102 is a cloud-based computing platform. The computing environment 100 further comprises a client computing device 101 that is in network communication with computing system 102 over a network 104 (e.g., the Internet, an intranet, or the like). According to further embodiments, the client computing device 101 and/or computing system 102 is a computing device operated by a user, such as a desktop computing device, a laptop computing device, a tablet computing device, a smartphone, a gaming console, a virtual reality computing device, an augmented reality computing device, or a wearable computing device.

The computing system 102 includes a processor 106 and memory 108. The memory 108 stores instructions, that when executed by the processor 106, cause the processor 106 to perform certain functionalities associated with computing system 102 and and/or its component parts. The computing system 102 may also comprise one or more data stores, for example, keyword data store 122, classifier data store 124, interaction data store 126, knowledge base 128, and content data store 130.

Computing system 102 further comprises search engine 110 and keyword retrieval engine 112. It is appreciated that in certain examples, the search engine 110 and keyword retrieval engine 112 are combined such that search engine 110 is configured to perform all or some of the functionalities of retrieval engine 112.

As will be described in greater detail below, the computing device 102, through search engine 110 and the retrieval engine 112, is generally configured to (1) obtain query text from a query set forth by a user operating client computing device 101; (2) provide the query text as input into an encoder module where the encoder module outputs a textual embedding based upon the query text; (3) obtain a novel keyword from a keyword database comprising a plurality of keywords; (4) provide the novel keyword as input into the encoder module where the encoder module outputs a textual embedding based upon the novel keyword; (5) identify one or more classifiers for keywords similar to the novel keyword; (6) provide the textual embedding based upon the novel keyword and the classifiers of similar keywords as input into a combiner model, wherein the combiner model outputs a textual embedding representative of the novel keyword and the classifiers of similar keywords; (7) compute a similarity score based upon a similarity between the textual embedding based upon the query text and the textual embedding output by the combiner model; (8) generate search results based upon the query where the results comprises content selected based upon the computed similarity score; and (9) cause the search results to be presented at the client computing device 101.

The above functionality involves operation of the search engine 110 and the keyword retrieval engine 112. The keyword retrieval engine 112 comprises an encoder 114, a classifier 116, a combiner model 118, and a content selection module 120. The encoder 114 is utilized by the keyword retrieval engine to perform language-based encoding of textual inputs. For example, encoder 114 is used to create a textual embedding for the text of a query (e.g., a query received from computing device 101) and a textual embedding for keywords. In an example, the encoder 114 may be a language-based encoder, such as the Bidirectional Encoder Representations from Transformers (BERT) model. In some examples, encoder 114 encodes keywords as they are added to the keyword data store 122.

Classifier 116 comprises one or more classifiers configured to apply labels to keywords in the keyword data store 122. Classifier 116 is configured to train new classifiers based upon interaction data (e.g., via interaction data store 126). Once a sufficient amount of interaction data exists for a given keyword (e.g., >10 interactions), classifier 116 can train a new classifier for that keyword and store the classifier in classifier data store 124. Because the classifiers are trained using interaction data, additional information relating to interactions with a keyword is encoded within the classifier. This additional information is also referred to herein as "collaborative signals." In an example, a classifier for keyword "running shoes" is trained on interaction data detailing all of the times a user has interacted with content associated with the running shoes keyword. Of all of the interactions, collaborative signals may be indicative of other keywords or content that while not directly related to the core keyword, were nevertheless also interacted with by the same or similar users. For example, users who interacted with "running shoes" content may have also interacted with "fitness tracker" keywords. The relationship between the "running shoes" keyword and the "fitness tracker" keyword is thereby embedded in the collaborative signals within the "running shoes" classifier. In some examples, classifier 116 is an Extreme Classifier for extreme classification.

Computing system 102 further comprises combiner 118. The combiner 118 (also referred to as the "combiner model") is a model configured to receive two different embedding types (e.g., novel keywords and classifiers) and create an enriched embedding of the keyword text. In some embodiments the combiner 118 employs a single-layer self-attention block with novel type-embedding to represent a keyword.

In an example, the combiner 118 generates an output based upon:

$$\varepsilon^+(l) = \text{MLP}(\text{Self-Attention}(\varepsilon_\theta(z_l) + t_{enc}, w_1^l + t_{clf}, w_2^l + t_{clf}, w_{|s|}^l + t_{clf})) \quad (1)$$

Where $t_{enc}$ and $t_{clf}$ are type-embeddings, one for classifiers and one for the encoder. In some examples, the type-embeddings are learned like positional embeddings (as in BERT). In the above example, MLP is a linear transformation. Also, $\varepsilon_\theta(z_l)$ is the encoder representation computed on the basis of the keyword text and $\{w_j^l\}_{j \in S^l}$ represents the classifiers of associated seen keywords for keyword 1. In certain examples, the associated seen keywords $S^l$ may computed in a variety of ways depending on the class of keyword, e.g., seen, one-shot, or zero-shot. The resultant output of the combiner is an enhanced representation of the novel keyword. The keyword retrieval engine 112 may then match the novel keyword with query text.

Once an output of combiner 118 is obtained, keyword retrieval engine 112 determines a similarity between query text and the novel keyword via their respective embeddings. The similarity determined by the keyword retrieval engine 112 may be expressed as a similarity score (e.g., a value between 0 and 1). For example, encoder 114 is used to encode the query text and output a textual embedding for the query text. The output of the combiner 118 is a textual embedding of the novel keyword in addition to the collaborative signals of the seen keyword classifiers. In an example, the keyword retrieval engine 112 utilizes a cosine similarity to compute a similarity between the encoded query text and the output of the combiner 118. In some embodiments, the keyword retrieval engine 112 utilizes contrastive loss training for similarity determination.

The content selection module 120 selects a content (e.g., from content data store 130) based upon the similarity score computed by the keyword retrieval engine 112. In some examples, the novel keyword may have been associated priorly with one content, however, in some examples, the novel keyword may be associated with different content (from the same or different content publishers) based upon the similarity score. In some examples, the similarity score is correlated with a match type.

As described above, computing system 102 may access one or more data stores 122-130. While illustrated as individual data stores, it is appreciated that one or more of the data stores 122-130 may be combined into a single data store. In some examples, one or more of the data stores 122-130 is distributed amongst a plurality alternative data stores. Keyword data store 122 stores keywords as used by the computing system 102. New keywords can be added to the keyword data store 122 by the computing system 102 or from an external system (e.g., by a content publisher). In some examples, keyword retrieval engine 112 begins the keyword retrieval process as soon as a new keyword is added to the keyword data store 122.

Classifier data store 124 comprises trained classifiers (e.g., classifiers generated by way of classifier 116). In some examples, trained classifiers are added to the classifier data store 124 external from computing system 102. Interaction data store 126 stores interaction data related to user interactions with keywords (or content associated with the keywords). In some examples, interaction data store 126 comprises one or more user profiles indicative of attributes and/or behavior of a user. The user profiles thereby contain contextual information related to a user in addition to interaction data, for example, user attributes like age, gender, education level, location, income level, etc. In some examples, user profile information is included in interaction data that is used by classifier 116 to train classifiers.

Figure 2:
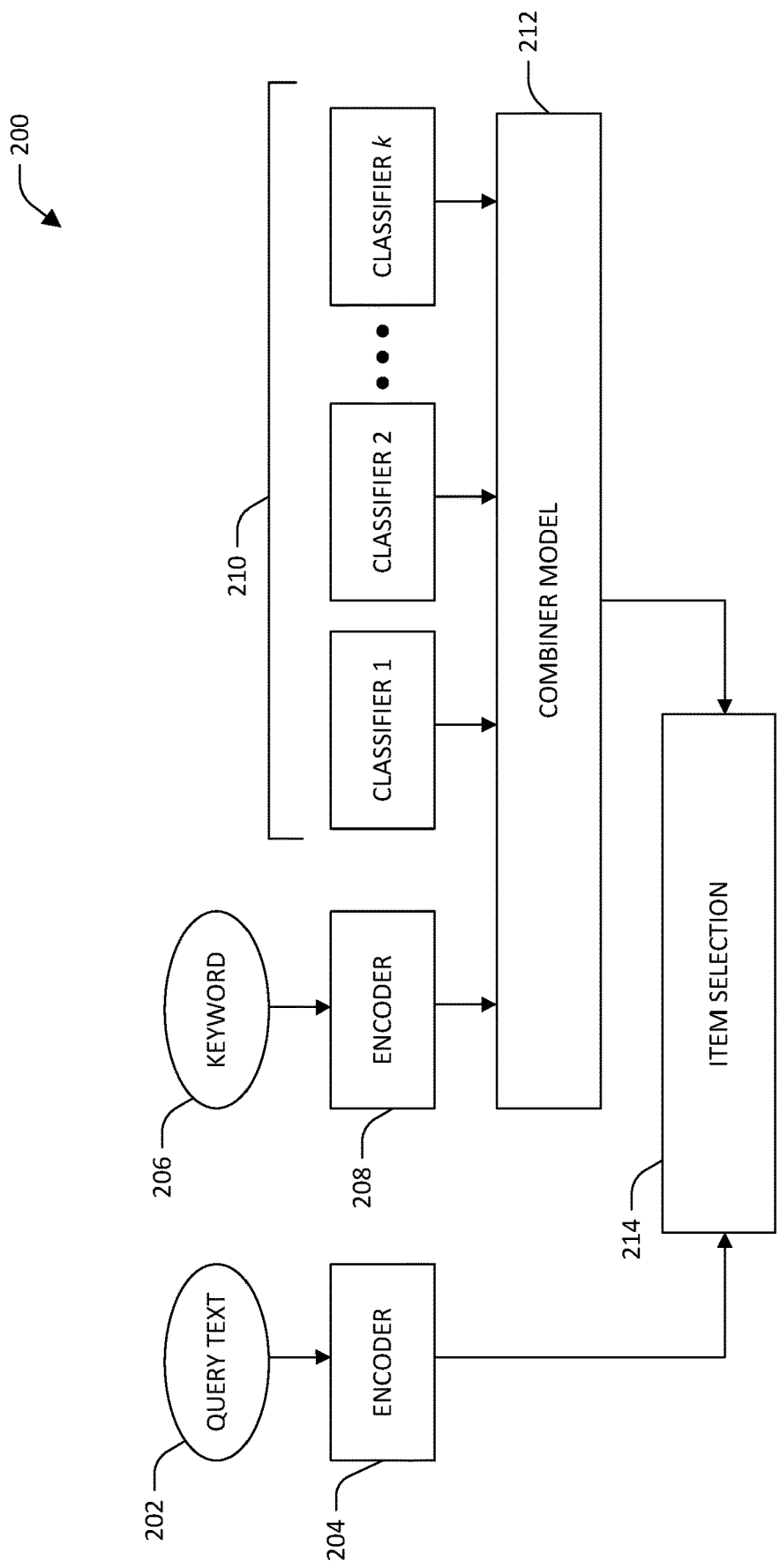
FIG. 2 is a functional block diagram of an example process flow for novel keyword retrieval and item selection.

Referring now to FIG. 2, an example process flow 200 for novel keyword retrieval and item selection is illustrated. Query text 202 is representative of a query that is set forth by a user of a computing device (e.g., client computing device 101). The query text 202 is encoded using encoder 204. The keyword 206 is encoded by encoder 208. While encoders 204 and 208 are illustrated separately, in some examples, they are the same encoder. In an example, the encoders 204 and 208 are a language-based encoder, such as the Bidirectional Encoder Representations from Transformers (BERT) model. Classifiers 210 comprise a plurality of seen keyword classifiers selected based upon their similarity with the novel keyword.

The similar seen classifiers 210 are classifiers trained upon interaction data for keywords similar to the novel keyword. In some examples, the novel keyword is evaluated against all available classifiers (e.g., classifiers in classifier data store 124) and k number of classifiers are selected as similar seen keywords. Different methodologies are contemplated for selecting k. In one example, a threshold score is applied and k is the number of classifiers with an output score above the threshold. In another example, k is a predetermined number of top ranked classifiers (e.g., the top 50 scores). In some examples, the system uses Approximate Nearest Neighbor Search (ANNS) to identify the classifiers of similar seen keywords. In one example, a maximum inner product search (MIPS) is used to identify classifiers of similar seen keywords. The top-k associated seen keyword classifiers calculated using MIPS can be represented as:

$$S_\theta{}^u = \arg\max_k \{\varepsilon_\theta(z_l)^T \varepsilon(z_u); l \in y_s\} \quad (2)$$

where u is the novel keyword. The top-k seen keywords are retrieved so that $|S_\theta{}^u|=k$. A shortlist $S_\theta{}^u$ may contain items that are textually similar based on $\varepsilon_\theta$ but may not be relevant to the novel keyword. To address this, a refinement step may be added to the classifier selection process, wherein a shortlist of candidate classifiers is further refined to remove classifiers that are not sufficiently similar to the novel keyword. In an example, $S_\theta{}^u$ is refined by pruning away irrelevant items by deploying the classifier representation of seen items to get $S_w{}^u$. The refinement of an initial identified classifier set can be expressed as:

$$S_w{}^u = \{l | w_l^T \varepsilon_\theta(z_u) \geq \tau_0; l \in S_\theta{}^u\} \quad (3)$$

for novel item (keyword) u, where $\varepsilon_\theta(z^u)$ is the encoder textual embedding of the novel keyword text, and $w_l$ is the seen classifier, $w_l^T \varepsilon_\theta(z_u)$ represents the similarity score between the classifier and encoder textual embedding. Using $\tau_0$ as a threshold, the top-k classifiers exceeding the similarity threshold are selected in the set of similar seen classifiers. The refinement step further enhances the similarity between the novel keyword and the seen keyword classifiers. In some examples, another shortlist is calculated based upon additional information from a one-shot or k-shot keyword. In this case, where interaction data related to the novel keyword is available, a second shortlist may be generated by evaluating the classifiers based upon the interaction data for the novel keyword. The associations for seen items are available from ground truth, e.g., $y_{lm}$ is observed when both l, m∈$y_s$. However, employing associations only on the basis of ground truth can lead to misalignment between seen and novel items as such associations are not available for novel items. Moreover, ground truth may bring in some undesirable or noisy associations. For example, in an exemplary encyclopedia dataset, categories of "Academics of King's College London" and "1878 deaths" have the article of "Johann Joseph Hoffmann" in common. However, associating the two categories may lead to providing spurious signals. By refining shortlist associations, the occurrence of these spurious signals is reduced. In some instantiations, top-k similarity score pairs or a similarity threshold are used for refining shortlist associations of seen items.

In the case of a one-shot novel keyword, where a query associated with the novel item is available, another shortlist may be generated by evaluating the classifiers on the revealed query. In example, the refinement methodology expressed in equation (3) can be used to obtain the shortlist of classifiers in view of the revealed query associated with the one-shot novel keyword. The two shortlists may then be combined, for example, by way of a max voting methodology.

The encoded keyword textual embedding output by encoder 208 and the classifiers 210 are provided as input into combiner 212. The combiner 212 may be configured separately for zero-shot and one-shot keywords. In an example, combiner 212 configured for one-shot keywords receives interaction data relating to the one interaction for the one-shot keyword and additionally combines the additional interaction data with the other input (e.g., the encoded novel keyword textual embedding output by encoder 208 and the similar seen keyword classifiers 210). By providing the one-shot interaction data to the combiner 212, improvements to the representation of the novel keyword are achieved without needing to retrain the base model (e.g., as is required in conventional systems). The novel keyword representation output by the combiner 212 can be performed very quickly (e.g., ≤1 ms) which makes the presently described keyword retrieval engine 112 well suited for applications such as sponsored search.

The query text embedding output of encoder 204 and the output of the combiner model 212 can then be compared. In an example, the similarity between the query text embedding and the novel keyword embedding (as output by the combiner 212) is determined using cosine similarity. In some examples, the similarity is determined according to a similarity score (e.g., a value between 0 and 1). Based upon this similarity, an item of content associated with the novel keyword is selected to be served (e.g., by the search engine 110) as part of search results responsive to query text 202. If the content is interacted with, the resultant interaction data can be used to later train a classifier for the novel keyword, provided enough interactions have occurred to train the classifier (e.g., >10 interactions).

Figure 3:
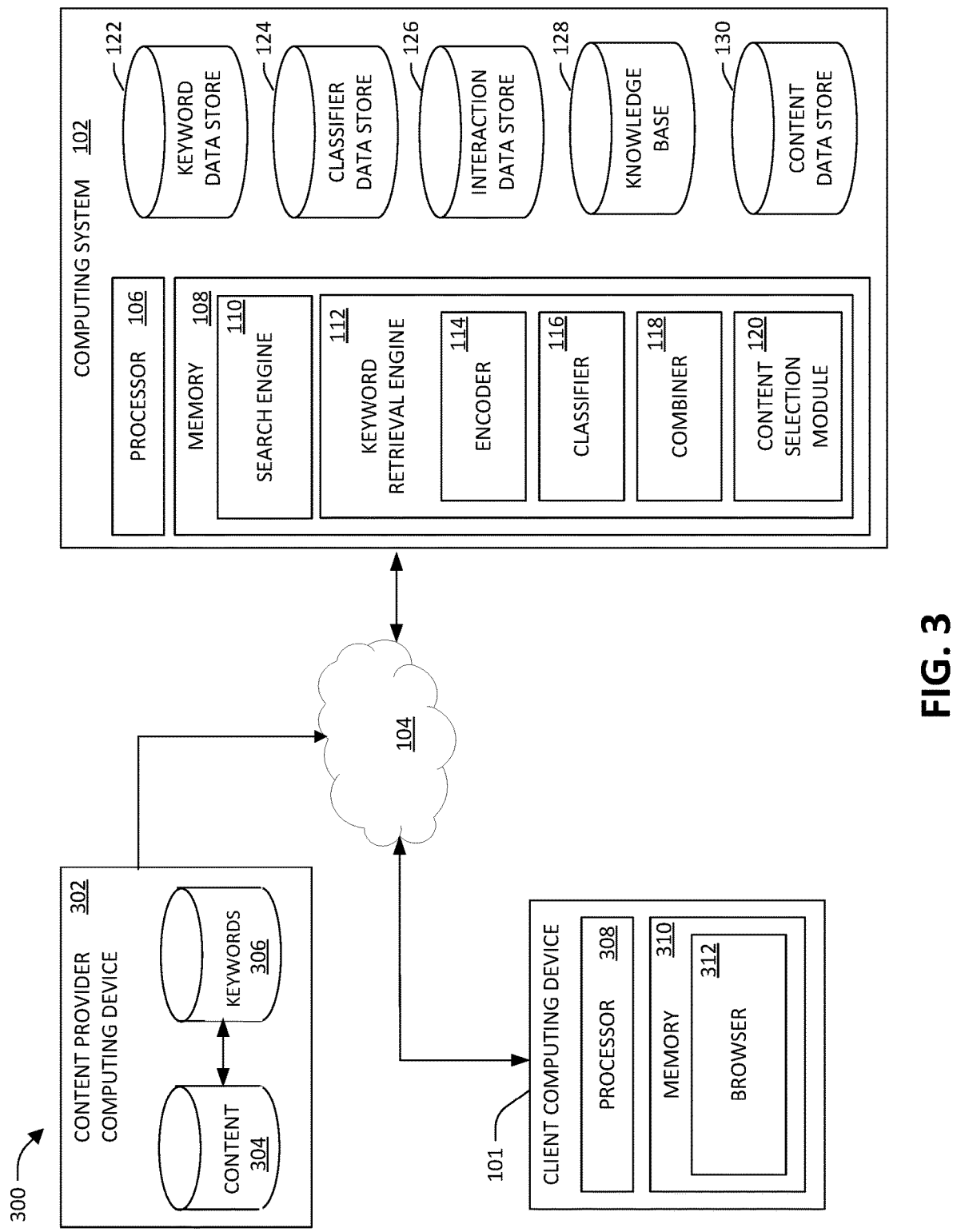
FIG. 3 is a functional block diagram of another example computing environment that facilitates retrieval of novel keywords for search.

Referring now to FIG. 3, an example computing environment 300. The computing environment 300 includes the computing system 102 and its various components described above (e.g. encoder 114, classifier 116, combiner 118, and content selection module 120).

The computing environment 300 further includes a content provider computing device 302. Content provider computing device 302 is in communication with the computing system 102 by way of the network 104. The content provider computing device 302 may be a desktop computing device, a laptop computing device, a smartphone, a tablet, a virtual reality computing device, an augmented reality computing device, or a wearable computing device. The content provider computing device 302 comprises a content data store 304 and a keyword data store 306. In some examples, the keywords in the keyword data store 306 are generated by the content provider (e.g., via the content provider computing device 302). It is appreciated that the content data store 304 is distinct from content data store 130 in that the content data store 304 is associated with a content provider user of the content provider computing device 302. The content provider computing device 302 may provide content from the content data store 304 to computing system 102 by way of network 104. The content provided by the content provider computing device 302 may then be stored at content data store 130 and used by the computing system 102 to provide content to the client computing device 101. It is appreciated that each content provider may operate their own independent content provider computing device 302.

The content provider computing device 302 includes input components that enable a user of the content provider computing device 302 to set forth input to the content provider computing device 302. The input components may include a mouse, a keyboard, a trackpad, a scroll wheel, a touchscreen, a camera, a video camera, a microphone, a controller, or the like.

The computing environment 300 operates in a manner similar to the computing environment 100 described above. Exemplary operation of the described computing environment 300 will now be described in greater detail below.

Computing environment 300 comprises client computing device 101, content provider computing device 302 and computing system 102. The client computing device 101, content provider computing device 302 and computing system 102 are in network communication with one another via network 104 (e.g., the Internet). The computing system 102 receives a query (e.g., via search engine 110) set forth by a user operating a client computing device 101. The query comprises text indicative of the intent of the user, e.g., what they user is searching for. The query may be set forth the query to search engine 110 using browser 312 of client computing device 101. The computing system 102 provides the query text to the keyword retrieval engine 112 which encodes the query text via encoder 114. The output of encoder 114 is a textual embedding of the query text. In an example, the encoder 114 may be a language-based encoder, such as the Bidirectional Encoder Representations from Transformers (BERT) model.

The keyword retrieval engine 112 obtains a novel keyword from a keyword data store 122. The keyword data store 122 comprises a plurality of keywords. In an example, keywords are provided by the content provider computing device 302 (e.g., from keywords data store 306). In some examples, novel keywords are streamed into the keyword data store 122 as they are generated (e.g., by content providers or others). The keywords in the database comprise one or more words and, in some examples, can comprise portions of words (e.g., acronyms, abbreviations, etc.) or entire phrases made up of several words. In some examples, keyword retrieval engine 112 begins processing novel keywords as they are received by the keyword data store 122 (e.g., as provided by one or more content providers).

After obtaining the novel keyword, the keyword retrieval engine 112 provides the novel keyword to the encoder module 114, where the encoder module outputs a textual embedding representative of the novel keyword. Based upon the novel keyword textual embedding, the keyword retrieval engine 112 identifies classifiers for seen keywords that are similar to the novel keyword within the classifier data store 124. A seen keyword is a keyword that has been served by the search engine and has been interacted with by a user. Each classifier is then representative of a specific keyword and content associated with the keyword (e.g., whatever was served by the search engine responsive to a query). The classifiers are encoded with interaction data relating to other content that users that have interacted with in addition to the classifier keyword.

In an example, keyword retrieval engine 112 identifies one or more classifiers of similar seen keywords by evaluating the novel keyword across all of the available classifiers to determine a similarity score (e.g., a value between 0 and 1) wherein the classifiers with the highest value similarity score are selected by the system. The system may select a different number of classifiers based upon a threshold value (e.g., top 100 classifiers with a similarity score above 0.9, etc.) According to some examples, a tiered approach may be employed wherein the system computes similarity score across all available classifiers to obtain the top-k associated seen classifiers. This shortlist of classifiers may then be refined again to further refine the set of similar seen classifiers. In some examples, the system uses Approximate Nearest Neighbor Search (ANNS) to identify the classifiers of similar seen keywords. In some examples, a maximum inner product search (MIPS) is used to identify classifiers of similar seen keywords. In some examples, a shortlist of candidate classifiers is identified. The shortlist of candidate classifiers is then reevaluated to reduce the number of candidate classifiers in the shortlist.

Once the classifiers of similar seen keywords are identified by keyword retrieval engine 112, the keyword retrieval engine 112 provides the novel keyword textual embedding and the classifiers for the similar seen keywords as input into combiner model 118. The combiner model 118 generates a textual embedding as output that is representative of the novel keyword and the one or more seen keyword classifiers.

As previously mentioned, because the seen keyword classifiers comprise a significant amount of additional data in the form of the collaborative signals, the resultant textual embedding output by the combiner model is significantly more robust than a textual embedding from an encoder model alone which is based on the novel keyword text alone.

Keyword retrieval engine 112 may then compute a similarity score between the textual embedding of the query text and the textual embedding output by the combiner module 118. In some examples, the similarity is determined using cosine similarity. In some examples, the similarity is determined by the content selection module 120. In some examples, the similarity is used to determine a match type, wherein a corresponding content is associated with each match type (or similarity score). Search engine 110 then generates search results based upon the query text. The results comprise the novel keyword or a content associated with the novel keyword (e.g., selected by content selection module 120).

In some examples the content provided as part of the search results is selected based upon the similarity score and/or a match type. In one example, the content is provided as part of the search results is served by the content provider computing device 302. For example, if a content provider is associated with a novel keyword that keyword retrieval engine 112 has determined is a match with the query text, the search engine may generate results that include a placeholder for content, and when the results are presented at the browser of the client computing device 101, the content provider computing device transmits the content (e.g., from content database 304) directly into a webpage displaying the search results at the client computing device 101. In some embodiments, computing system 102 facilitates a real-time or near real-time bidding process where the content associated with a novel keyword may be bid on by different content providers.

The above-described technologies present various advantages over conventional search technologies. Conventional search methodologies perform poorly with respect to retrieval of novel keywords. The technologies described herein demonstrate that an enriched representation of a novel keyword leads to better representation of the keyword and can result in an improved likelihood of interaction with the keyword and/or keyword content when presented as part of search results served responsive to a query.

Keyword retrieval engine 112 can be further enhanced through pre-training. For example, the keyword retrieval engine 112 can be trained using an embedding-based dense retriever. This allows the keyword retrieval engine 112 to make use of advancements in teacher training, negative-mining, loss functions, etc. In some examples, keyword retrieval engine 112 utilizes a modular pipeline where the encoder (e.g., encoder 114) is trained in a first phase and the classifiers and combiner are trained in a second phase with a fixed encoder. In an example, at the first phase, the encoder 114 is learned using negative mining. At the second stage, the learned encoder is fixed, and the classifier 116 and combiner 118 are trained. In some examples, training data used to train the encode, classifiers, and/or the combiner is obtained via knowledge base 128.

Figure 4:
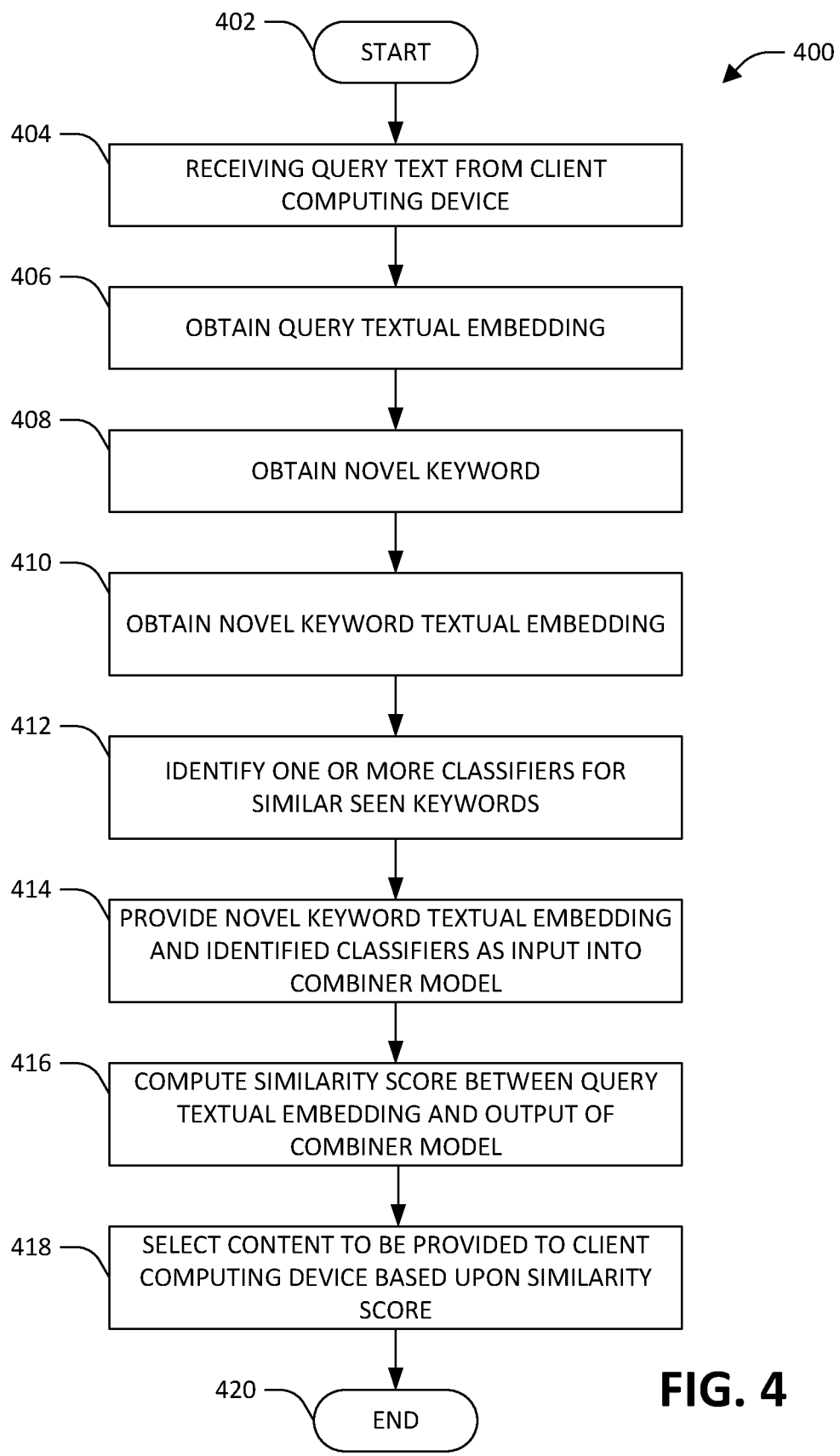
FIG. 4 is a flow diagram that illustrates an example methodology for novel keyword retrieval and item selection.

FIG. 4 illustrates an example methodology relating to retrieval of novel keywords for search. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

Referring now to FIG. 4, an example methodology 400 for retrieval of novel keywords for search is illustrated. The methodology starts at step 402. At step 404, a query comprising query text is received from a client computing device (e.g., client computing device 101). In some examples, the query is set forth via a browser executed on computing device 101. At step 406, a textual embedding for the query text is obtained, for example, by providing the query text as input into an encoder module where the encoder module outputs a textual embedding based upon the query text. At step 408, a novel keyword is obtained (e.g., from a keyword database comprising a plurality of keywords. A novel keyword is a keyword that has limited or no interaction data associated therewith. For example, a zero-shot keyword has no interaction data associated with the keyword. A one-shot keyword has one interaction datapoint associated therewith, and a k-shot keyword has k interaction datapoints associated therewith. In some examples, a novel keyword is a zero-shot or one-shot keyword. At step 410 a textual embedding for the novel keyword is obtained, for example, by providing the novel keyword as input an encoder module (e.g. encoder 114) where the encoder module outputs a textual embedding based upon the novel keyword.

At step 412, one or more classifiers for similar seen keywords are identified. The similar seen classifiers are classifiers trained upon interaction data for keywords similar to the novel keyword. In some examples, the novel keyword is evaluated against all available classifiers (e.g., classifiers in classifier data store 124) and k number of classifiers are selected as similar seen keywords. Different methodologies are contemplated for selecting k. In one example, a threshold score is applied and k is the number of classifiers with an output score above the threshold. In another example, k is a predetermined number of top ranked classifiers (e.g., the top 50 scores, regardless of threshold value).

At step 414, the textual embedding for the novel keyword and the classifiers of similar seen keywords are provided as input into a combiner model (e.g., combiner 118). Responsive to receiving the input, the combiner model outputs a textual embedding representative of the novel keyword and the classifiers of similar keywords. The embedding output by the combiner model is indicative of collaborative signals provided by the classifiers. At step 416, a similarity score is computed. The similarity score is based upon a similarity between the textual embedding based upon the query text and the textual embedding output by the combiner model. In some examples, the similarity score is computed as the cosine similarity between the embedding of the query text and the textual embedding output by the combiner model. In some examples, a similarity model may be used to determine the similarity score. The similarity model may be trained using contrastive loss.

At step 418, content is selected (e.g., via content selection module 120) based upon the similarity score computed at step 416. The content may be content that is associated with the novel keyword, for example, a link to a webpage, an image, video content, etc. In some examples, the novel keyword may be associated with one content, however, in some examples, the novel keyword may be associated with different content (from the same or different content publishers) based up the similarity score. In some examples, the similarity score is correlated with a match type. Upon selection of the content, search results may be generated based upon the query where the results comprise content selected based upon the computed similarity score. The search results may then be provided for presentation to a user of a client computing device.

Figure 5:
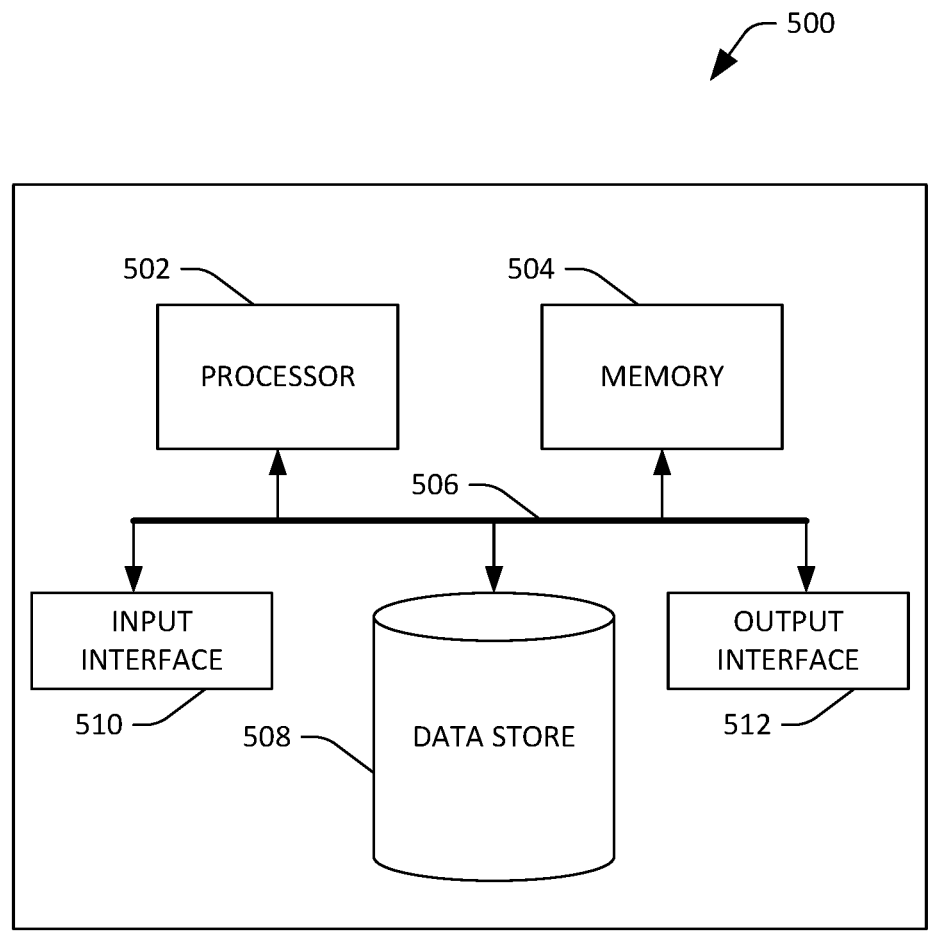
FIG. 5 depicts an example computing device.

Referring now to FIG. 5, a high-level illustration of an example computing device 500 that can be used in accordance with the systems and methodologies disclosed herein is illustrated (e.g., computing device 101, computing system 102, and/or content provider computing device 302). The computing device 500 includes at least one processor 502 that executes instructions that are stored in a memory 504. The instructions may be, for instance, instructions for implementing functionality described as being carried out by one or more components discussed above or instructions for implementing one or more of the methods described above. The processor 502 may access the memory 504 by way of a system bus 506. In addition to storing executable instructions, the memory 504 may also store keywords, classifiers, interaction data, and/or content.

The computing device 500 additionally includes a data store 508 that is accessible by the processor 502 by way of the system bus 506. The data store 508 may include executable instructions, computer-readable text that includes words, etc. The computing device 500 also includes an input interface 510 that allows external devices to communicate with the computing device 500. For instance, the input interface 510 may be used to receive instructions from an external computer device, from a user, etc. The computing device 500 also includes an output interface 512 that interfaces the computing device 500 with one or more external devices. For example, the computing device 500 may display text, images, etc. by way of the output interface 512.

It is contemplated that the external devices that communicate with the computing device 500 via the input interface 510 and the output interface 512 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 500 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 500 may be a distributed system. Thus, for instance, several devices may be in communication by way of a network connection and may collectively perform tasks described as being performed by the computing device 500.

The present disclosure relates to domain expressive text to speech according to at least the following examples:

(A1) In one aspect, some embodiments include a method (e.g., 400) executed by a processor (e.g., 106) of a computing system (e.g., 102). The method comprises receiving a query set forth by a user of a client computing device (e.g., 101), wherein the query comprises computer-readable text. The method further comprises providing the query text as input into an encoder module (e.g., 114), wherein the encoder module outputs a first textual embedding based upon the query text. The method additionally comprises obtaining a novel keyword from a keyword database (e.g., 122) comprising a plurality of keywords. The method further comprises providing the novel keyword as input into the encoder module, wherein the encoder module outputs a second textual embedding based upon the novel keyword. The method additionally comprises identifying classifiers for keywords similar to the novel keyword based upon the second textual embedding, wherein each of the classifiers has been trained based upon a seen keyword and interaction data indicative of user interaction with the seen keyword when the seen keyword is presented in response to a search query. The method additionally comprises providing the second textual embedding and the classifiers as input into a combiner model (e.g., 118), wherein the combiner model outputs a third textual embedding representative of the novel keyword and the one or more classifiers. The method additionally comprises computing a similarity score based upon a similarity between the first textual embedding and the third textual embedding and generating search results based upon the query, wherein the results comprise a first content selected from a plurality of content (e.g., from content data store 130) based upon the similarity score. The method further comprises causing the search results to be presented at the client computing device (e.g., at browser 312).

(A2) According to some embodiments of the method of A1, the method further comprises a combiner model comprising a single-layer self-attention block.

(A3) According to some embodiments of any of the methods of (A1)-(A2), wherein the one or more classifiers comprises collaborative signals based upon interaction data, wherein the interaction data is indicative of activity of a user.

(A4) According to some embodiments of any of the methods of (A1)-(A3), wherein the first content is selected from the plurality of content additionally based on collaborative signals embedded in the output of the combiner.

(A5) According to some embodiments of any of the methods of (A1)-(A4), wherein the first content is selected from the plurality of content additionally based on a match type indicative of the similarity between the first textual embedding and the third textual embedding.

(A6) According to some embodiments of any of the methods of (A1)-(A5), identifying classifiers for keywords similar to the novel keyword further comprises: identifying a shortlist of candidate classifiers, evaluating the shortlist of candidate classifiers via at least one of Approximate Nearest Neighbor Search (ANNS) or a maximum inner product search (MIPS), and eliminating candidate classifiers from the shortlist of candidate classifiers based upon a computed similarity based upon at least the ANNS or MIPS evaluation.

(A7) According to some embodiments of any of the methods of (A1)-(A6), obtaining the novel keyword comprises retrieving the novel keyword from among a plurality of novel keywords streamed into the keyword database.

(A8) According to some embodiments of any of the methods of (A1)-(A7), the one or more classifiers are identified by evaluating the novel keyword across a plurality of classifiers in a classifier database.

(A9) According to some embodiments of any of the methods of (A1)-(A8), the novel keyword is a one-shot novel keyword, and wherein the combiner model additionally receives as input interaction data related to the novel keyword.

(A10) According to some embodiments of any of the methods of (A1)-(A9), the interaction data comprises click through data indicative of an interaction with a content displayed when the seen keyword is presented in response to a search query.

(A11) According to some embodiments of any of the methods of (A1)-(A10), the encoder, classifiers, and combiner are pre-trained using a modular pipeline where the encoder is trained in a first phase and the classifiers and combiner are trained in a second phase using the trained encoder.

(A12) According to some embodiments of any of the methods of (A1)-(A11), the first content is a webpage link wherein the webpage link is inserted into a portion of a search engine results page.

(A13) According to some embodiments of any of the methods of (A1)-(A12), the first content is video content, wherein the video content is inserted into a portion of a search engine results page.

(B1) In another aspect, some embodiments include a computing system (e.g., 102) that includes a processor (e.g., 106) and memory (e.g., 108). The memory stores instructions that, when executed by the processor, cause the processor to perform any of the methods described herein (e.g., any of A1-A13).

(C1) In yet another aspect, some embodiments include a non-transitory computer-readable storage medium that includes instructions that, when executed by a processor (e.g., 106) of a computing system (e.g., 102), cause the processor to perform any of the methods described herein (e.g., any of A1-A13).

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. Such computer-readable storage media can include random-access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

As used herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "module", "model" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system, comprising:
a processor; and
memory storing instructions that, when executed by the processor, cause the processor to perform acts comprising:
receiving a query set forth by a user of a client computing device, wherein the query comprises text;
providing the query text as input into an encoder module, wherein the encoder module outputs a first textual embedding based upon the query text;
obtaining a novel keyword from a keyword database comprising a plurality of keywords;
providing the novel keyword as input into the encoder module, wherein the encoder module outputs a second textual embedding based upon the novel keyword;

based upon the second textual embedding, identifying classifiers for keywords similar to the novel keyword, wherein each of the classifiers has been trained based upon a seen keyword and interaction data indicative of user interaction with the seen keyword when the seen keyword is presented in response to a search query;

providing the second textual embedding and the classifiers as input into a combiner model, wherein the combiner model outputs a third textual embedding representative of the novel keyword and the classifiers;

computing a similarity score based upon a similarity between the first textual embedding and the third textual embedding;

generating search results based upon the query, wherein the results comprise a first content selected from a plurality of content based upon the similarity score; and causing the search results to be presented at the client computing device.

2. The computing system of claim 1, wherein the combiner model comprises a single-layer self-attention block.

3. The computing system of claim 1, wherein the one or more classifiers comprise collaborative signals based upon interaction data, wherein the interaction data is indicative of activity of a user.

4. The computing system of claim 3, wherein the first content is selected from the plurality of content additionally based on the collaborative signals embedded in the output of the combiner.

5. The computing system of claim 1, wherein the first content is selected from the plurality of content additionally based on a match type indicative of the similarity between the first textual embedding and the third textual embedding.

6. The computing system of claim 1, wherein identifying classifiers for keywords similar to the novel keyword further comprises:
identifying a shortlist of candidate classifiers;
evaluating the shortlist of candidate classifiers via at least one of Approximate Nearest Neighbor Search (ANNS) or a maximum inner product search (MIPS);
eliminating candidate classifiers from the shortlist of candidate classifiers based upon a computed similarity based upon at least the ANNS or MIPS evaluation.

7. The computing system of claim 1, wherein obtaining the novel keyword comprises retrieving the novel keyword from among a plurality of novel keywords streamed into the keyword database.

8. The computing system of claim 1, wherein the one or more classifiers are identified by evaluating the novel keyword across a plurality of classifiers in a classifier database.

9. The computing system of claim 1, wherein the novel keyword is a one-shot novel keyword, and wherein the combiner model additionally receives as input interaction data related to the novel keyword.

10. The computing system of claim 1, wherein the interaction data comprises click through data indicative of an interaction with a content displayed when the seen keyword is presented in response to a search query.

11. The computing system of claim 1, wherein the encoder, classifiers, and combiner are pre-trained using a modular pipeline where the encoder is trained in a first phase and the classifiers and combiner are trained in a second phase using the trained encoder.

12. The computing system of claim 1, wherein the first content is a webpage link wherein the webpage link is inserted into a portion of a search engine results page.

13. The computing system of claim 1, wherein the first content is video content, wherein the video content is inserted into a portion of a search engine results page.

14. A method executed by a processor of a computing system, the method comprising:
receiving a query set forth by a user of a client computing device, wherein the query comprises text;
providing the query text as input into an encoder module, wherein the encoder module outputs a first textual embedding based upon the query text;
obtaining a novel keyword from a keyword database comprising a plurality of keywords;
providing the novel keyword as input into the encoder module, wherein the encoder module outputs a second textual embedding based upon the novel keyword;
based upon the second textual embedding, identifying classifiers for keywords similar to the novel keyword, wherein each of the classifiers has been trained based upon a seen keyword and interaction data indicative of user interaction with the seen keyword when the seen keyword is presented in response to a search query;
providing the second textual embedding and the classifiers as input into a combiner model, wherein the combiner model outputs a third textual embedding representative of the novel keyword and the one or more classifiers;
computing a similarity score based upon a similarity between the first textual embedding and the third textual embedding;
generating search results based upon the query, wherein the results comprise a first content selected from a plurality of content based upon the similarity score; and
causing the search results to be presented at the client computing device.

15. The method of claim 14, wherein the first content is selected from the plurality of content additionally based on a match type indicative of the similarity between the first textual embedding and the third textual embedding.

16. The method of claim 14, wherein the one or more classifiers comprise collaborative signals based upon interaction data, wherein the interaction data is indicative of activity of a user.

17. The method of claim 14, wherein the novel keyword is a one-shot novel keyword, and wherein the combiner model additionally receives as input interaction data related to the novel keyword.

18. The method of claim 14, wherein the novel keyword is generated by a content provider and streamed into the keyword database.

19. A non-transitory computer-readable storage medium comprising instructions that, when executed by a processor of a computing system, cause the processor to perform acts comprising:
receiving a query set forth by a user of a client computing device, wherein the query comprises text;
providing the query text as input into an encoder module, wherein the encoder module outputs a first textual embedding based upon the query text;
obtaining a novel keyword from a keyword database comprising a plurality of keywords;
providing the novel keyword as input into the encoder module, wherein the encoder module outputs a second textual embedding based upon the novel keyword;

based upon the second textual embedding, identifying classifiers for keywords similar to the novel keyword, wherein each of the classifiers has been trained based upon a seen keyword and interaction data indicative of user interaction with the seen keyword when the seen keyword is presented in response to a search query;

providing the second textual embedding and the classifiers as input into a combiner model, wherein the combiner model outputs a third textual embedding representative of the novel keyword and the classifiers;

computing a similarity score based upon a similarity between the first textual embedding and the third textual embedding;

generating search results based upon the query, wherein the results comprise a first content selected from a plurality of content based upon the similarity score; and causing the search results to be presented at the client computing device.

20. The non-transitory computer-readable storage medium of claim 19, wherein the classifiers comprise collaborative signals based upon interaction data, wherein the interaction data is indicative of activity of a user.

* * * * *